Feb. 25, 1947.　　　　J. R. WILLIAMS　　　　2,416,601
ELECTRIC POWER SYSTEM
Filed Sept. 20, 1944
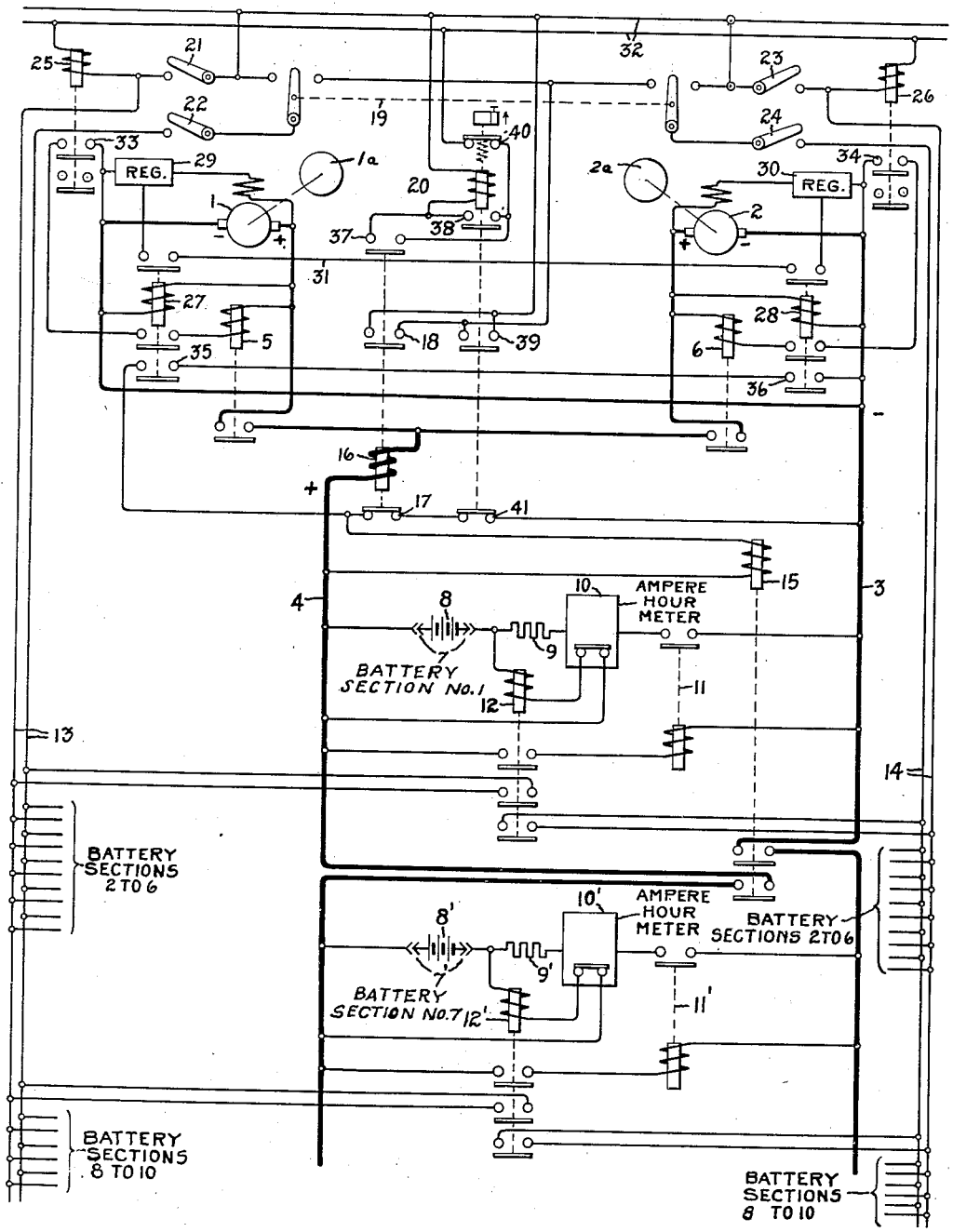
Inventor:
John R. Williams,
by Harry E. Dunham
His Attorney.

Patented Feb. 25, 1947

2,416,601

UNITED STATES PATENT OFFICE 2,416,601

ELECTRIC POWER SYSTEM

John R. Williams, Schenectady, N. Y., assignor to General Electric Company, a corporation of New York Application September 20, 1944, Serial No. 554,944

10 Claims. (Cl. 171—118)

1

This invention relates to electric power systems and more particularly to improvements in automatically controlled multiple-unit electric power supply systems.

When power is to be supplied to a load which is widely variable it is often more economical to use a number of relatively small power sources than one large source because the number of small units in service at any one time can be varied with variations in load so as to keep each unit in operation at approximately full load and maximum efficiency, whereas a single unit large enough to carry the maximum load will operate a considerable length of the time at part load and hence at relatively low efficiency.

In accordance with this invention there is provided a novel control system for automatically varying the number of power sources which are in operation in proportion to the total load and for preventing the overloading of any of the unit power sources. The invention is particularly adapted to the control of motor generator sets which are used for charging storage batteries and the invention is characterized by automatic means for dropping part of the load temporarily, in case an overload of one unit is threatened, until such time as another power unit is available for sharing the load.

An object of the invention is to provide a new and improved electric power system.

Another object of the invention is to provide a new and improved automatic battery charging system.

A further object of the invention is to provide a new and improved load control system for multiple power unit electric power supply systems.

The invention will be better understood from the following description taken in connection with the accompanying drawing and its scope will be pointed out in the appended claims.

Referring now to the single figure of the accompanying drawing, which illustrates diagrammatically an embodiment of the invention, two power supply units are shown, by way of example, as comprising direct-current generators 1 and 2 which may be driven by any suitable means, such, for example, as by motors (not shown). These generators have their negative terminals connected directly to the negative side or conductor 3 of a load bus and have their positive terminals connected to the positive side or conductor 4 of a load bus through the contacts of respective line contactors 5 and 6.

The load which is connected between the conductors of the load bus comprises, by way of example, a plurality of similar battery sections. Battery section No. 1 consists of a plug and socket type connector 7 into which the connections from a battery to be charged, such, for example, as a battery 8, may be plugged. In series with this receptacle is a resistor 9 for controlling the charging current, an ampere-hour meter 10 and the contacts of a battery contactor 11. The ampere-hour meter has a pair of normally closed contacts connected in series with the operating coil of a battery relay 12 whose terminals are connected across the contacts of the battery receptacle so that when a battery is plugged in the voltage of the battery will energize the battery relay provided the ampere-hour meter contacts are closed. The battery relay 12 has a set of normally open contacts which control the connections of the operating coil of the battery contactor 11 between the main load bus conductors 3 and 4. The battery relay 12 also has two additional sets of normally open contacts which are connected across control circuits 13 and 14 respectively. These latter circuits control the starting and stopping of the generators 1 and 2 respectively, as will be described more fully below.

Additional duplicate battery sections, such as sections 2–6 inclusive, may also be connected between the main load conductors 3 and 4 but in order to simplify the drawing only the connections leading from the control circuits 13 and 14 to the normally open contacts of the battery relays of these sections are shown.

In order to prevent overloading of one of the generators an isolating contactor 15 has two sets of normally open contacts which are connected serially in the conductors 3 and 4 respectively. Additional battery sections are connected between the conductors 3 and 4 beyond the contacts of the isolating contactor, these additional sections being indicated as sections No. 7 to No. 10 inclusive. These sections may be duplicates of section No. 1 and, as shown, section No. 7 comprises elements corresponding to those of section No. 1. Sections Nos. 8–10 inclusive correspond with the other battery sections and, as in the case of sections Nos. 2–6 inclusive, only the conductors leading from the control circuits 13 and 14 toward the normally open contacts of the battery relays of these sections have been shown.

The operation of the isolating contactor 15 is controlled by a load current relay 16 whose operating coil is connected serially in the positive load bus 4 and which has a set of normally closed contacts 17 which control the connections of the operating coil of the isolating contactor between the negative and positive load buses 3 and 4.

For automatically controlling the starting of the second generator in case the load becomes too large for the first one to carry the load current relay 16 is also provided with a set of normally open contacts 18 which are selectively connectable in the starting circuits for the generators 1 and 2 by means of a selector switch 19.

If the major part of the load is beyond the contacts of the isolating contactor, that is to say, if the battery sections Nos. 7–10 inclusive are in operation and only one or two of sections Nos. 1–6 inclusive are in operation, then the picking up of the load current relay 16 and the subsequent dropping out of the isolating contactor 15 will result in a pumping action because the dropping of most of the load will cause the load current relay 16 to drop out again, thus causing the isolating contactor 15 to pick up again and reconnect the major part of the load to the system. In order to prevent this a timer 20 is provided.

The starting of the generator 1 may be controlled manually by closing a switch 21 or may be controlled automatically by closing a switch 22 and, likewise, the starting of the generator 2 may be controlled manually by closing a switch 23 and may be controlled automatically by closing a switch 24. Under automatic operation the operating times of the generators may be equalized by means of the selector switch 19 which predetermines which one of the generators starts first and thus operates the greater proportion of the time. Thus, this switch can be thrown in one direction for, say, six months and then moved to its other position for the next six months.

The generators 1 and 2 may be started and driven by any suitable means and, as shown by way of example, a motor starter 25 is provided for controlling the starting of the motor 1a which drives generator 1 and a motor starter 26 is provided for controlling the starting of the motor 2a which drives generator 2. As shown, the starting contactors 25 and 26 are respectively provided with contacts 25a and 26a which directly control the starting of the motors 1a and 2a.

As it is important in a battery charging system to prevent reversed current, the operation of the line contactor 5 for generator 1 is controlled by a voltage relay 27 and by the starter 25 and the operation of line contactor 6 for generator 2 is controlled by a voltage relay 28 and by the starter 26.

In order to insure proper charging, the generator 1 is provided with an automatic voltage regulator of any suitable type shown schematically at 29 and, similarly, the generator 2 is provided with an automatic voltage regulator shown schematically at 30, and in order, further, to insure division of load when both generators are operating in parallel an equalizer connection between the two regulators is provided by a conductor 31, the connections of which are controlled by the voltage relays 27 and 28. The control circuits are energized by any suitable source of current supply, such as by an auxiliary supply circuit 32.

The operation of the illustrated embodiment of the invention is as follows: Assume that it is desired to have the system operate automatically in such a manner that generator 1 supplies all of the initial loads connected to the system. To do this switches 22 and 24 are closed and switch 19 is moved to the left. If now battery 8 is plugged into receptacle 7 of battery section No. 1 and the ampere-hour meter 10 has been set to provide the battery with the correct amount of charge the battery relay 12 will pick up, thus connecting the battery contactor 11 across the main load circuit. At the same time the two lowermost sets of normally open contacts on the battery relay close. The set of these contacts which is connected across control circuit 13 will then connect the winding 25 of the motor starter for generator 1 across the control supply circuit 32 through the closed contacts of the switches 19 and 22 in series. The motor starter 26 will not be energized by the closure of the set of normally open contacts on the battery relay 12 which are connected across the control circuit 14 because with the selector switch 19 moved to the left its contacts which are in series with the switch 24 will be open. Thus, if switch 19 had been moved to the right instead of to the left, then motor starter 26 would pick up rather than motor starter 25.

The picking up of the motor starter 25 will cause the driving means or motor (not shown) for generator 1 to start and come up to speed in any conventional manner. When the voltage of generator 1 reaches the proper value the voltage relay 27 will pick up and thus will connect the line contactor 5 across the generator 1 through a set of normally open interlock contacts 33 on the motor starter 25. The purpose of these interlock contacts is to insure that the line contactor 5 will drop out immediately when the motor starter 25 is deenergized so as to prevent the batteries from feeding reversed current to the generator 1 as it slows down due to the deenergization of its motor starter. The picking up of the line contactor 5 completes the connection of the generator 1 across the load circuit or, more specifically, in the diagram it connects the positive terminal of the generator to the positive load bus 4, the negative terminal of the generator being permanently connected to the negative load bus 3. Battery contactor 11 now picks up and battery 8 then receives charging current at the proper voltage.

The application of voltage between the main load conductors 3 and 4 also causes the isolating contactor 15 to pick up as this contactor is connected between these conductors through a set of normally closed contacts 17 and through a set of normally closed contacts to be described later which are on the timer 20.

From the above description it will be seen that merely by plugging a battery into the receptacle of any one of the battery sections one or the other of the generators 1 and 2, depending upon the position of the switch 19, will be automatically started and brought up to speed and connected across the line so as to charge the battery at the proper rate. The subsequent plugging of batteries into the receptacles of other sections will then merely increase the load on the generator which is in operation, namely, generator 1 under the assumed conditions. When the load reaches the maximum value which is permissible for generator 1 to carry, then the load current relay 16 will pick up, thus opening its contacts 17 which causes the isolating contactor 15 to drop out and closing the contacts 18 of the load current relay 16 which connect the motor starter 26 across the control supply circuit 32 through the contacts of switch 19, through switch 24 and through the control circuit 14 which is closed by the contacts of any one of the battery relays 12. The generreestablish said connections at the expiration of a predetermined interval of time.

4. In combination, a pair of motor-generator sets, a load circuit, means responsive to the connection of a load across said load circuit for starting one of said motor-generator sets and connecting its generator across said load circuit upon its voltage reaching a predetermined value, means responsive to a predetermined load on said one motor-generator set for starting the other motor-generator set and connecting its generator across said load circuit upon its voltage reaching a predetermined value, and means for preventing an overload on said one motor-generator set during the time that the other motor-generator set is starting and its generator voltage is coming up to the rated circuit voltage, said last-mentioned means including load responsive switching means for disconnecting the generator of said one motor-generator set from at least as much of the load on said circuit as can overload said one motor-generator set and a time delay device set in operation in response to operation of said switching means for controlling said switching means to reconnect said disconnected portion of said load to said generators.

5. In combination, a pair of generators, a load circuit, one of said generators being connected to supply current up to a predetermined load value to said load circuit, means responsive to a load in excess of said predetermined load on said load circuit for starting the other generator and connecting it across said load circuit upon its voltage reaching a predetermined value, means for preventing an overload on said one generator during the time that the other generator is starting and its voltage is coming up to the rated circuit voltage, said last-mentioned means including load responsive electromagnetic switching means for disconnecting said one generator from at least as much of the load on said load circuit as substantially overloads said one generator, and a time element device for insuring that the other generator once started is brought up to speed and connected across said load ciruit regardless of the operation of said disconnecting means.

6. In combination, a pair of motor-generator sets, a load circuit, means responsive to the connection of a load across said load circuit for starting one of said motor-generator sets and connecting its generator across said load circuit upon its voltage reading a predetermined value, means responsive to a predetermined load on said one motor-generator set for starting the other motor-generator set and connecting its generator across said load circuit upon its voltage reaching a predetermined value, means for preventing an overload on said one motor-generator set during the time that the other motor-generator set is starting and its generator voltage is coming up to the rated circuit voltage, said last-mentioned means including load responsive electromagnetic switching means for disconnecting the generator of said one motor-generator set from at least such portion of the load on said circuit as can substantially overload said one motor-generator set, and timing means for insuring that the other motor-generator set once started is brought up to speed and connected across said load circuit regardless of the operation of said disconnecting means and for reconnecting the generator of said one motor-generator set to said portion of the load a predetermined interval of time after said disconnecting operation.

7. In combination, a pair of generators, a load circuit, one of said generators being normally connected to supply current up to a predetermined load value to said load circuit, means responsive to a load in excess of said predetermined load on said one generator for starting the other generator and connecting it across said load circuit upon its voltage reaching a predetermined value, means for preventing an overload on said one generator during the time that the other generator is starting and its voltage is coming up to the rated voltage of the load circuit, said last-mentioned means including load responsive switching means for disconnecting said one generator from at least such portion of the load on said load circuit as can substantially overload said one generator, and time element means for preventing said switching means from reconnecting said one generator to said portion of the load for a predetermined interval of time after said disconnecting operation thereby to prevent pumping of said disconnecting means.

8. In combination, a pair of motor-generator sets, a load circuit, means responsive to the connection of a load across said load circuit for starting one of said motor-generator sets and connecting its generator across said load circuit upon its voltage reading a predetermined value, means responsive to a predetermined load on said one motor-generator set for starting the other motor-generator set and connecting its generator across said load circuit upon its voltage reaching a predetermined value, means for preventing an overload on said one motor-generator set during the time that the other motor-generator set is starting and its generator voltage is coming up to the rated load circuit voltage, said last-mentioned means including load responsive switching means for disconnecting the generator of said one motor-generator set from a portion of the load on said circuit, and timing means for preventing said switching means from reconnecting said one generator to said portion of the load for a predetermined interval of time after said disconnecting operation thereby to prevent pumping of said overload preventing disconnecting means.

9. In combination, a pair of generators, a load circuit, one of said generators being normally connected to supply current up to a predetermined load value to said load circuit, means responsive to a load in excess of said predetermined load on said one generator for starting the other generator and connecting it across said load circuit upon its voltage reaching a predetermined value, means for preventing an overload on said one generator during the time that the other generator is starting and its voltage is coming up to the rated load circuit voltage, said last-mentioned means including load responsive switching means for disconnecting said one generator from a portion of the load on said circuit, means for insuring that the other generator once started is brought up to speed and connected across said load circuit regardless of the operation of said disconnecting means, and time element means for preventing said switching means from reconnecting said one generator to said portion of the load for a predetermined interval of time after said disconnecting operation thereby to prevent pumping of said disconnecting means.

10. In combination, a pair of motor-generator sets, a load circuit, means responsive to the connection of a load across said load circuit for startator 2 will therefore be started and will come up to speed and when its voltage is of the proper value the voltage relay 28 will close, thus connecting line contactor 6 across the generator 2 through a set of interlock contacts 34 which correspond to contact 33. The picking up of line contactor 6 will connect generator 2 in parallel with generator 1.

The picking up or reclosing of isolating contactor 15 when the load current relay 16 is picked up is effected by auxiliary normally open contacts 35 and 36 on voltage relays 27 and 28 respectively. These contacts are connected in series and they serve to connect the upper terminal of the operating coil of the isolating contactor 15 to the negative side 3 of the main circuit, the other side of this contactor being permanently connected to the positive side 4 of the main circuit.

Under certain operating conditions the operation of the isolating contactor 15 in response to the picking up of the load current relay 16 will cause the dropping of sufficient load to result in the dropping out of the load current relay 16 so that a pumping action will occur and the generator 2 will never be brought up to speed. In order to prevent such failure a set of normally open contacts 37 on the load current relay close as soon as the relay 16 picks up and complete an energizing circuit for the timer 20. This timer has a set of instantaneously closing seal-in contacts 38 connected in parallel with the contacts 37 so that the timer immediately picks up and seals in. The timer also has a set of normally open instantaneously closing contacts 39 which are connected in parallel with the contacts 18 of the load current relay 16 so that a momentary closing of the contacts 18 which accompany a momentary pick-up and drop-out of the load current relay 16 will cause the timer to pick up and maintain the energization of the starting circuit for the second generator through the contacts 39. After a predetermined time, which corresponds to the time required to bring the second generator on the line, a set of normally closed time delay opening contacts 40 on the timer open and deenergize the timer. However, by this time the second generator is on the line, the isolating contactor 15 is closed through the contacts 35 and 36 on the voltage relays for the generators, and the load current relay 16 is picked up so that its contacts 18 are closed and the running circuit of the second generator is maintained closed.

In order to prevent the jarring action and the surges of load current which would accompany a pumping action of the isolating contactor 15 and the load current relay 16 a set of normally closed contacts 41 on the timer are connected in series with the contacts 17 of the load current relay. Therefore, as soon as the timer picks up and seals in, the circuit of the isolating contactor 15 is definitely opened and is maintained open until the second generator comes on the line and the series connection is completed through the contacts 35 and 36.

The load current relay 16 can be any device which will pick up at a predetermined current but it can also be a reversed current protective device which will drop out the generator contactors in case the motor starters do not have interlocks.

In case both generators are operating and the main power supply for their driving motors fails and service is then restored it will be noted that my control system provides automatic protection in that as soon as the first generator comes back on the line the line current relay 16 will pick up and thus will start the second generator and bring it on the line and during this time the isolating contactor will drop some of the load so as to prevent overloading of the first generator while the second one is being brought up to speed.

This arrangement of dropping load until the second generator comes on the line can be applied to any distribution system, alternating current or direct current, where more than one source of power is available. It eliminates the use of expensive current regulating devices and also the generators do not have to have the oversize capacity necessary if they have to withstand overloads and especially the heavy peaks of load imposed when the main source of supply fails and comes back on, thus starting the first generator and placing very large loads on it until the second can be brought on the line.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a pair of generators, a load circuit, one of said generators being connected to supply current up to a predetermined load value to said load circuit, means responsive to a load in excess of said predetermined load on said load circuit for starting the other generator and connecting it across said load circuit upon its voltage reaching a predetermined value, and means for preventing an overload on said one generator during the time that the other generator is starting and its generator voltage is coming up to the rated circuit voltage.

2. In combination, a pair of generators, a load circuit, one of said generators being connected to supply current up to a predetermined load value to said load circuit, means responsive to a load in excess of said predetermined load on said load circuit for starting the other generator and connecting it across said load circuit upon its voltage reaching a predetermined value, and means for preventing an overload on said one generator during the time that the other generator is starting and its generator voltage is coming up to the rated circuit voltage comprising automatically operated switching means for dropping some of the load during said time and subsequently restoring it.

3. In combination, a pair of motor-generator sets, a load circuit, means responsive to the connection of a load across said load circuit for starting one of said motor-generator sets and connecting its generator across said load circuit upon its voltage reaching a predetermined value, means responsive to a predetermined load on said one motor-generator set for starting the other motor-generator set and connecting its generator across said load circuit upon its voltage reaching a predetermined value, and means for preventing an overload on said one motor-generator set during the time that the other motor-generator set is starting and its generator voltage is coming up to the rated circuit voltage comprising load responsive switching means for interrupting the connections of said one generator to a portion of said load and a time delay device cooperating with said switching means to ing one of said motor-generator sets and connecting its generator across said load circuit upon its voltage reaching a predetermined value, means responsive to predetermined load on said one motor-generator set for starting the other motor-generator set and connecting its generator across said load circuit upon its voltage reaching a predetermined value, means for preventing an overload on said one motor-generator set during the time that the other motor-generator set is starting and its generator voltage is coming up to the rated circuit voltage, said last-mentioned means including load responsive switching means for disconnecting the generator of said one motor-generator set from a portion of the load on said circuit, timing means for insuring that the other motor-generator set once started is brought up to speed and connected across said load circuit regardless of the operation of said overload preventing disconnecting means, and means controlled by said timing means for preventing said switching means from reconnecting said one generator to said portion of the load for a predetermined interval of time after said disconnecting operation thereby to prevent pumping of said overload preventing disconnecting means.

JOHN R. WILLIAMS.

REFERENCES CITED

The following references are of record in the file of this patent:

UNITED STATES PATENTS

| Number | Name | Date |
|---|---|---|
| 1,626,688 | Newmeyer | May 3, 1927 |
| 1,677,715 | Gittings | July 17, 1928 |
| 2,082,110 | Langabeer | June 1, 1937 |